(12) United States Patent
Koch

(10) Patent No.: US 8,202,184 B2
(45) Date of Patent: Jun. 19, 2012

(54) HOUSING OF A TENSIONING SYSTEM WITH AN INTERGRATED SPRAY NOZZLE

(75) Inventor: Reinhard Koch, Wachenroth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 796 days.

(21) Appl. No.: 11/574,987

(22) PCT Filed: Sep. 1, 2005

(86) PCT No.: PCT/EP2005/009408
§ 371 (c)(1),
(2), (4) Date: Mar. 20, 2007

(87) PCT Pub. No.: WO2006/027153
PCT Pub. Date: Mar. 16, 2006

(65) Prior Publication Data
US 2009/0124441 A1      May 14, 2009

(30) Foreign Application Priority Data

Sep. 10, 2004   (DE) .................. 10 2004 043 733

(51) Int. Cl.
*F16H 7/22* (2006.01)
*F16H 7/08* (2006.01)
*F16N 7/16* (2006.01)
*F16N 13/22* (2006.01)

(52) U.S. Cl. ...... 474/110; 474/111; 184/15.1; 184/15.2; 184/15.3

(58) Field of Classification Search ................. 474/110, 474/101, 111; 123/196 S, 196 R; 239/488; 184/15.1, 15.2, 15.3
See application file for complete search history.

(56) References Cited

U.S. PATENT DOCUMENTS

| | | | | |
|---|---|---|---|---|
| 1,536,931 A * | 5/1925 | Robbins | ....................... | 239/289 |
| 1,701,563 A * | 2/1929 | Griswold | ................... | 123/90.36 |
| 1,744,250 A * | 1/1930 | Trechsel | ..................... | 123/41.35 |
| 1,881,425 A * | 10/1932 | Ferguson | ........................ | 48/107 |
| 2,044,375 A * | 6/1936 | Walker | ............................ | 267/50 |
| 2,375,612 A * | 5/1945 | Barr | ................................ | 184/6.8 |
| 2,570,972 A * | 10/1951 | Nakken | ........................ | 239/488 |
| 2,583,726 A * | 1/1952 | Chalom | ......................... | 451/36 |
| 2,703,019 A * | 3/1955 | Burawoy | ...................... | 474/110 |
| 2,800,119 A * | 7/1957 | Schmidl | ..................... | 123/41.35 |
| 2,942,597 A * | 6/1960 | Reggio | ......................... | 123/379 |
| 3,048,915 A * | 8/1962 | Chute et al. | ............. | 29/890.142 |
| 3,166,611 A * | 1/1965 | Conant et al. | ................ | 261/41.5 |
| 3,558,053 A * | 1/1971 | Hruby, Jr. | ....................... | 239/17 |

(Continued)

FOREIGN PATENT DOCUMENTS

DE           2525352 A        12/1976

(Continued)

*Primary Examiner* — Michael Mansen
*Assistant Examiner* — Henry Liu
(74) *Attorney, Agent, or Firm* — Lucas & Mercanti, LLP; Klaus P. Stoffel

(57) ABSTRACT

The invention relates to a tensioning system (8) of a traction mechanism (1) to which a hydraulic fluid is applied and which interacts with a tensioning rail (6). The design of the tensioning system (8) provides that in the operating state hydraulic fluid is fed to the traction means (2) and/or the tensioning rail (6) via a transverse groove (18) which is located in the region of an attachment screw (15) and has an end-side spray nozzle (22).

8 Claims, 3 Drawing Sheets

U.S. PATENT DOCUMENTS

| | | | |
|---|---|---|---|
| 3,709,109 A * | 1/1973 | Howe | 92/186 |
| 3,720,289 A * | 3/1973 | Moldenhauer | 184/15.2 |
| 4,021,170 A * | 5/1977 | Andersen et al. | 425/72.1 |
| 4,122,818 A * | 10/1978 | Hattori | 123/196 AB |
| 4,299,584 A * | 11/1981 | Sproul | 474/135 |
| 4,504,251 A * | 3/1985 | Mittermeier | 474/110 |
| 4,507,103 A * | 3/1985 | Mittermeier | 474/110 |
| 4,826,470 A * | 5/1989 | Breon et al. | 474/110 |
| 4,876,990 A * | 10/1989 | Hodgkins et al. | 123/41.35 |
| 4,901,679 A * | 2/1990 | Hodgkins et al. | 123/41.35 |
| 4,963,121 A * | 10/1990 | Himura et al. | 474/110 |
| 4,974,561 A * | 12/1990 | Murasaki et al. | 123/90.31 |
| 5,092,292 A * | 3/1992 | Iguchi et al. | 123/196 R |
| 5,249,556 A * | 10/1993 | Emmitt | 123/196 S |
| 5,259,820 A * | 11/1993 | Mott | 474/110 |
| 5,277,664 A * | 1/1994 | Mott | 474/110 |
| 5,366,417 A * | 11/1994 | Shimaya | 474/112 |
| 5,419,742 A * | 5/1995 | Shimaya | 474/112 |
| 5,538,341 A * | 7/1996 | Padgett et al. | 366/134 |
| 5,601,505 A * | 2/1997 | Tada | 474/110 |
| 5,643,117 A * | 7/1997 | Dembosky | 474/110 |
| 5,718,650 A * | 2/1998 | Smith et al. | 474/110 |
| 5,730,673 A * | 3/1998 | Schnupke et al. | 474/110 |
| 5,885,179 A * | 3/1999 | Lewis et al. | 474/110 |
| 5,954,159 A * | 9/1999 | Nakamura | 184/11.2 |
| 5,967,920 A * | 10/1999 | Dembosky et al. | 474/109 |
| 6,260,533 B1 * | 7/2001 | Tanaka | 123/196 R |
| 6,494,387 B1 * | 12/2002 | Kaneko | 239/296 |
| 6,520,139 B1 * | 2/2003 | Kobayashi | 123/196 R |
| 6,532,930 B2 * | 3/2003 | Kobayashi et al. | 123/196 R |
| 6,619,247 B2 * | 9/2003 | Kobayashi | 123/90.15 |
| 6,662,771 B2 * | 12/2003 | Kobayashi | 123/90.33 |
| 6,863,042 B2 * | 3/2005 | Oh | 123/196 R |
| 6,875,141 B2 * | 4/2005 | Konishi et al. | 474/109 |
| 7,007,648 B2 * | 3/2006 | Fujikubo | 123/90.34 |
| 7,051,684 B2 * | 5/2006 | Bauer | 123/41.35 |
| 7,086,354 B2 * | 8/2006 | Dunbar et al. | 123/41.35 |
| 2005/0115523 A1 * | 6/2005 | Bauer | 123/41.35 |

FOREIGN PATENT DOCUMENTS

| | | |
|---|---|---|
| DE | 3145115 A | 5/1983 |
| DE | 3609579 A | 10/1987 |

* cited by examiner

HOUSING OF A TENSIONING SYSTEM WITH AN INTERGRATED SPRAY NOZZLE

FIELD OF THE INVENTION

The present invention relates to a hydraulically activated tensioning system for a traction mechanism which is intended in particular for an internal combustion engine. The tensioning system comprises a fixed housing which is preferably detachably attached to the internal combustion engine and includes a cylinder space, for the purpose of receiving and guiding a piston to which a hydraulic fluid can be applied. In the installed state, the piston is operatively connected indirectly or directly to a tensioning rail which is supported on the traction means. The housing here preferably has on one underside a feed duct which, in an installed state of the tensioning system, produces a connection between the cylinder space of the housing and a fluid bore in the internal combustion engine, a partial quantity of the hydraulic fluid being used for lubricating and/or cooling the traction means or other elements of the engine.

BACKGROUND OF THE INVENTION

By way of example, DE 36 39 389 A1 discloses a chain drive of an internal combustion engine having a hydraulically activated tensioning system. The tensioning system comprises a housing which is filled with a hydraulic fluid and in which a piston which is configured in a hollow cylindrical fashion and to which a spring force is applied is displaceably guided. In this context, the piston is operatively connected directly to a tensioning rail which is supported on the empty strand of the traction mechanism. The tensioning rail has a bore in the supporting region of the piston on said tensioning rail. The size of the bore is dimensioned such that a spray oil quantity which emerges via the piston is directed immediately onto the outer contour of the traction means by the tensioning rail. This measure serves to reduce the friction between the traction means and the tensioning rail by selective lubrication. This measure for achieving a means of guiding the traction means on the tensioning rail in a way which reduces friction requires a special cylinder housing and an adapted tensioning rail to be formed.

DE 36 09 579 A1 discloses a traction mechanism for an internal combustion engine which has, as traction means, a control chain which is pretensioned by means of a tensioning rail. In this context, a bearing point of the tensioning rail comprises spray bores which are offset with respect to one another and via which a lubricant is fed directly to the control chain. This lubrication of the traction means requires a relatively high flow rate of the lubricant in order to be able to feed sufficient lubricant to the control chain simultaneously via all the spray bores which are arranged offset with respect to one another.

SUMMARY OF THE INVENTION

Taking the disadvantages of the known solutions as a starting point, the invention is based on the object of providing effective lubrication of the traction means which is easy to carry out.

This object as well as further objects which arise, inter alia, from the following description of the invention, are achieved in that the partial quantity of the hydraulic fluid which is provided for lubrication is firstly directed, starting from a feed duct of the housing, into a bore, intended for the attachment screw, of the screw-on dome of the housing. At the end, the bore is connected to a transverse groove which forms a spray nozzle at the outlet end. This structure for lubricating and/or cooling a traction means can be implemented cost-effectively with very simple technical means, for example as a milled groove. For pressure die cast components it is advantageous to form the transverse groove by means of a non-metal-cutting integrally formed-on element. Furthermore, the invention permits the transverse groove, and thus the spray nozzle, to be arranged as desired. As a result, the spray nozzle can be positioned in such a way that it is ensured that lubricant or hydraulic fluid is discharged in an ideal fashion for the purpose of lubricating and/or cooling as well as reducing friction. The spray nozzle is preferably arranged in such a way that it wets, for example, the surface of the traction means with lubricant in a region before a bearing zone of the tensioning rail against the traction means. This provides a desired friction-optimized, wear-reducing guidance of the traction means at the tensioning rail.

One preferred development of the invention provides for the bore which is intended for the attachment screw to be provided with at least one longitudinal groove which opens into the transverse groove in the region of a screw head bearing of the screw-on dome. The longitudinal groove ensures defined passage of the hydraulic fluid through the screw-on dome.

Further advantageous refinements of the invention refer to the shaping of the transverse groove. According to one preferred embodiment, the transverse groove forms a cross-sectional profile which is formed as a semicircle and can be cost-effectively formed in the screw-on dome or the screw-on housing by milling. This cross-sectional shape advantageously permits the lubricant to be sprayed on in a planar form and not in punctiform fashion as is customary with bores, permitting the traction means, in particular a chain, to be wetted over a wide area and thus over the entire zone of contact between the tensioning rail and the lubricant.

Alternatively, a transverse groove which is widened in a wedge shape or conical shape starting from the longitudinal groove is suitable for this purpose. This opening region is provided in particular for tensioning systems in which the screw-on dome is located in the direct vicinity of the traction means in order, despite a small distance, to apply lubricant to the traction means or the tensioning rail over a wide area.

The invention also includes a transverse groove configuration which tapers in a conical shape or wedge shape starting from the longitudinal groove. This provides the possibility of spanning a relatively large distance between the outlet for the lubricant and the traction means.

A further advantageous alternative of the invention provides for the screw-on dome to be provided with a plurality of, preferably two, transverse grooves which are oriented in the manner of beams. The transverse grooves which are each splayed apart from one another, or oriented in the manner of beams, starting from the longitudinal groove, are likewise suitable for applying lubricant to the traction means or the tensioning rail over a wide area.

According to the invention, the tensioning system also comprises an attachment screw which encloses a screw head or an assigned washer and which extends radially over the entire length of the transverse groove and covers it completely. In addition to this, it is advantageous to provide a separate sealing washer or a sealing means between the screw head of the attachment screw and a bearing face of the screw-on dome. This measure ensures unimpeded, selective and loss-free flow of the lubricant through the transverse groove so that the traction means and/or the tensioning rail are wetted with the lubricant in an unimpeded fashion.

In order to attach the tensioning system according to the invention, preferably two machine screws are provided, said machine screws being respectively inserted opposite one another or offset with respect to one another on the two sides in receptacle bores in the housing and being screwed into threaded bores in the internal combustion engine. The feed duct of the screw-on dome is very largely oriented radially with respect to the cylinder space, and in the installed position it directly brings about a connection between the cylinder space of the housing and the fluid bore in the internal combustion engine.

The invention will be explained in more detail below by means of a plurality of exemplary embodiments which are illustrated in a total of five figures.

BRIEF DESCRIPTION OF THE DRAWINGS the drawings, in which.

DETAILED DESCRIPTION OF THE DRAWINGS

Figure 1:
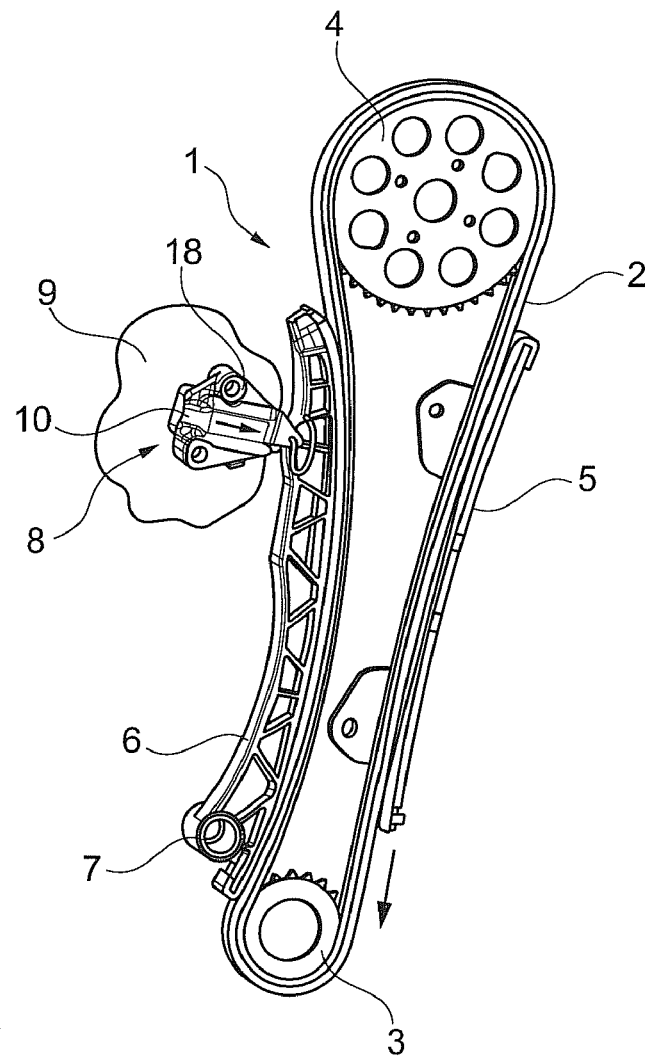
FIG. 1 is a perspective view of a traction mechanism in conjunction with a tensioning system according to the invention.

FIG. 1 shows a traction mechanism 1 of an internal combustion engine 9 (not illustrated in more detail). A traction means 2 of the traction mechanism 1 connects here an output wheel 3, a pulley wheel or chain wheel, which is connected in particular to the crankshaft of the internal combustion engine, to a drive wheel 4, for example a pulley or chain wheel which is connected to a camshaft of the internal combustion engine 9. The traction means 2 which rotates in the clockwise direction is guided in the region of a pulling strand on a guide rail 5. Furthermore, a tensioning rail 6, which can be tilted about a rotational axis 7 and interacts with a tensioning system 8, is assigned to the traction mechanism 1 in the region of an empty strand.

Figure 2:
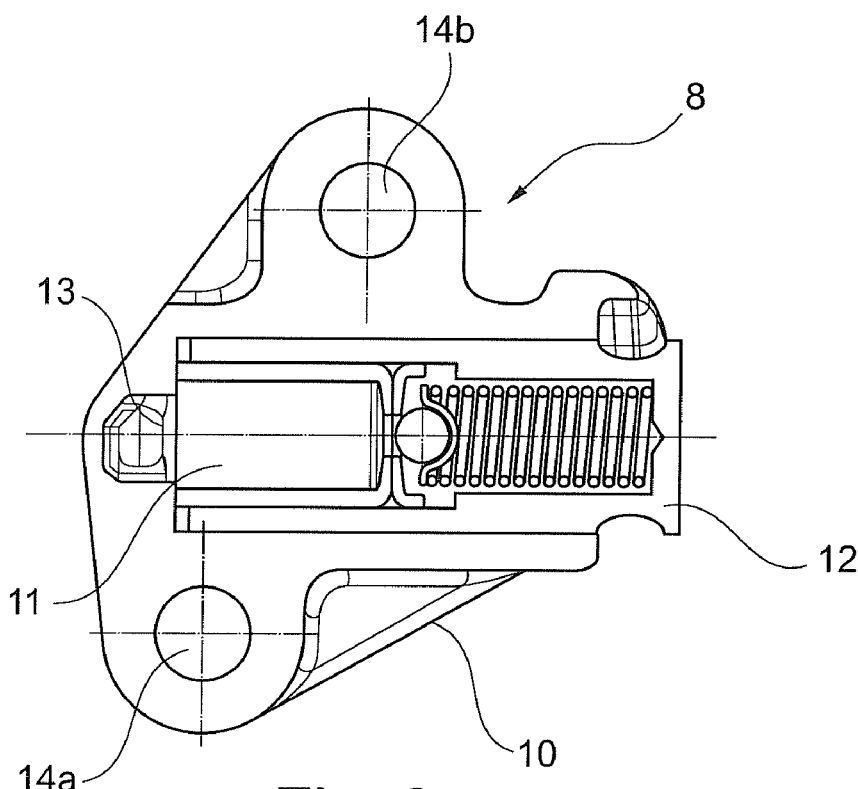
FIG. 2 is a sectional drawing of the design of a tensioning system.

The rotational axis 7 is provided here at one end of the tensioning rail 6. At the end remote therefrom, the tensioning system 8 of the tensioning rail 6 is assigned. Hydraulic fluid, in particular a lubricant of a pressurized circulating lubrication system of the internal combustion engine 9, is applied to the tensioning system 8 which is attached in a positionally fixed fashion to the internal combustion engine 9. As a result, a piston 12, which is integrated in a housing 10 of the tensioning system 8, is inserted in a slideable fashion and is illustrated in FIG. 2, is supported indirectly or directly on the tensioning rail 6. In the operating state, the tensioning system 8 applies a force, acting in the direction of the arrow, to the tensioning rail 6, as a result of which the latter pivots in the clockwise sense, in the direction of a position in which the traction means 2 is pretensioned.

FIG. 2 shows, in a sectional illustration, the design of the housing 10 in which a cylinder space 11 is intended to receive the piston 12. The cylinder space 11 is connected via a feed bore 13 to a pressurized circulating lubrication system of the internal combustion engine 9. Two bores 14a, 14b of the housing 10 are each intended for an attachment screw 15 which is illustrated in FIG. 5 and with which the tensioning system 8 is attached to the internal combustion engine 9.

Figure 3:
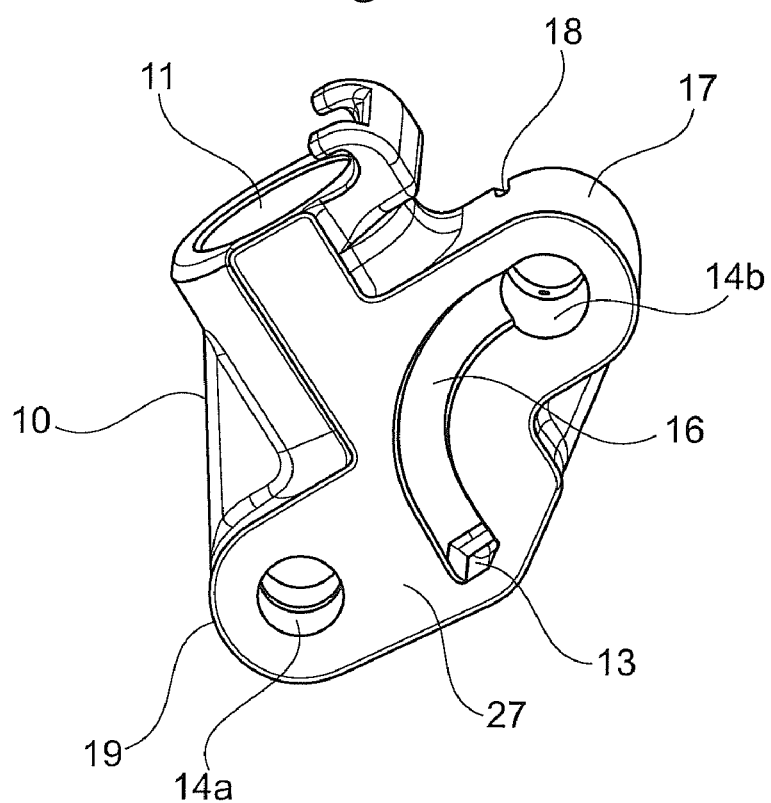
FIG. 3 is a drawing of individual parts of the housing of the tensioning system in perspective, with a viewing direction onto the bearing of the housing.

FIG. 3 shows the housing 10 in a perspective with a viewing direction onto a bearing 27 with which the housing and thus the tensioning system 8 bear against the internal combustion engine 9 in the installed state. This illustration clarifies the configuration of the feed duct 16 which, in the installed state, brings about a fluid connection from the feed bore 13 of the housing 10 to a bore 14b. For this purpose, the feed duct 16 is inserted in an arcuate shape into the bearing 27. In the operating state, owing to installation play which occurs between the attachment screw 15 and the bore 14b, hydraulic fluid, the lubricant of the internal combustion engine, is directed under pressure into this annular gap which surrounds the attachment screw 15, and in the process it flows over the entire length of the screw-on dome 17 and into a transverse groove 18.

Figure 6:
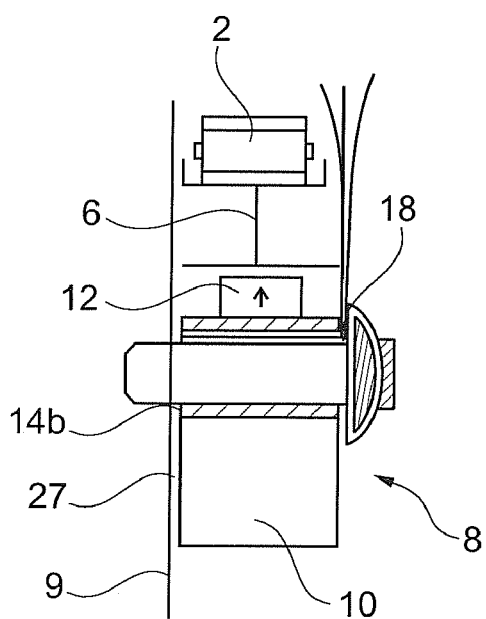
FIG. 6 shows a detail of the tensioning system in conjunction with the traction means and a tensioning rail to illustrate the function of the spray nozzle.
Figure 4:
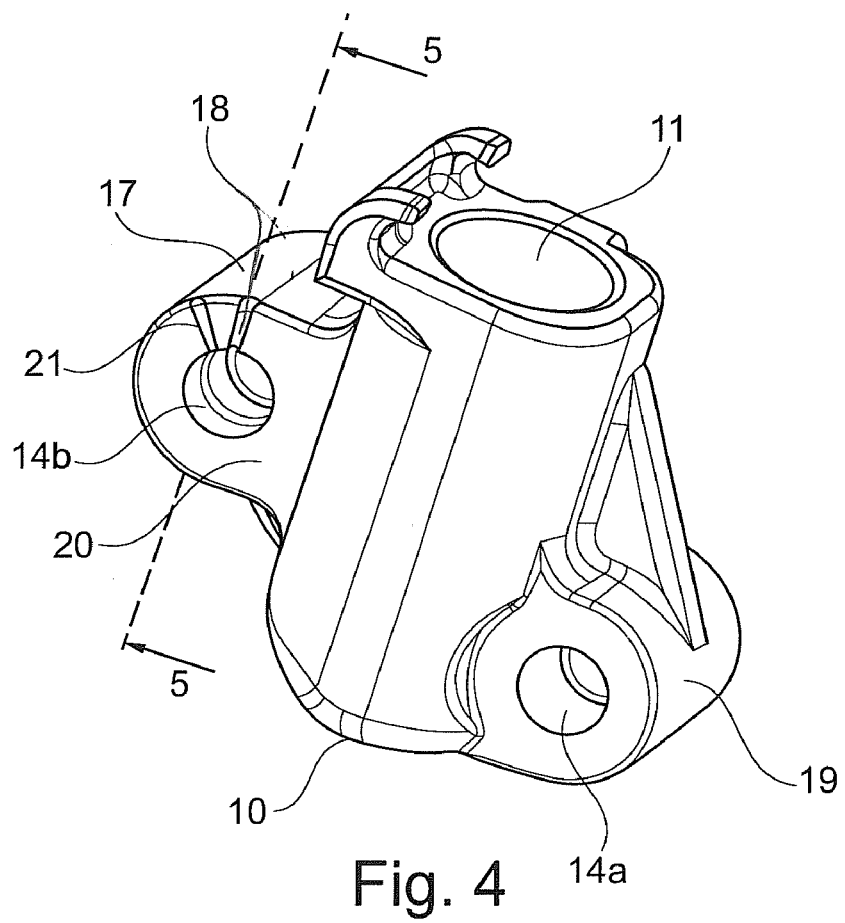
FIG. 4 shows the housing of the tensioning system in a further perspective illustration.
Figure 5:
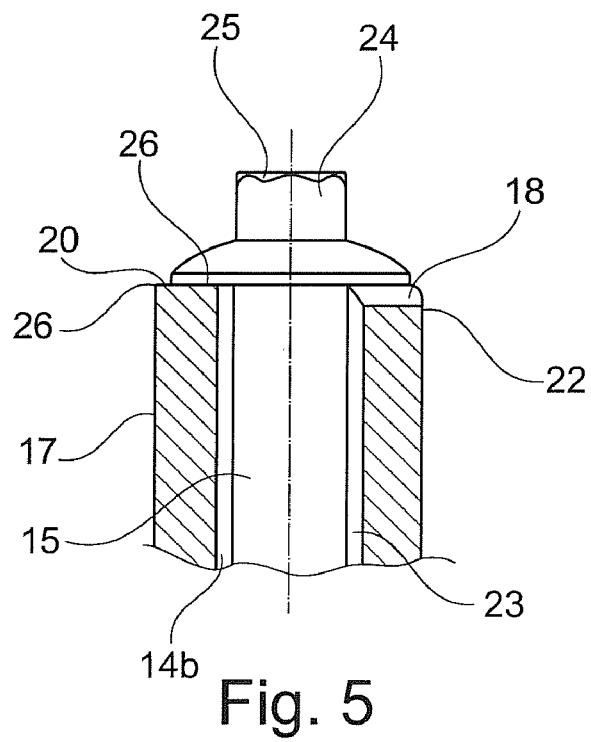
FIG. 5 shows a detail of the tensioning system.

The configuration and arrangement of the transverse groove 18 are clarified by FIGS. 4 through 6. The illustration of the housing according to FIG. 4 shows the transverse groove 18 which starts radially from the bore 14a and is formed with a semicircular cross-sectional profile in a bearing face 20 of the screw-on dome 17. As an alternative to a transverse groove 18, FIG. 4 shows a further transverse groove 21, the transverse grooves 18, 21 being arranged extending from the bore 14b in a splayed or radiating fashion with respect to one another.

The sectional illustration according to profile 5-5 from FIG. 4, which extends through the screw-on dome 17, clarifies in particular the flow of hydraulic fluid or of the lubricant or lubricating oil through the bore 14 as well as through the transverse groove 18 before it emerges from the screw-on dome 19 via an end spray nozzle 22 and acts on the traction means 2 or the tensioning rail 6. As can be seen in FIG. 6, the transverse groove 18, which is configured as a spray nozzle 22 at one end, permits lubricant to be applied to the traction means 2 over a wide area in order to effectively reduce the friction between the tensioning rail 6 and the traction means 2 and to sufficiently lubricate the components of the traction means. In order to increase the throughput of fluid, the bore 14b additionally has a longitudinal groove 23 which opens directly into the transverse groove 18. For the method of operation of the transverse groove 18 or of the spray nozzle 22, an effective cover of the bearing face 20 is necessary over the entire length of the transverse groove 18. In a corresponding fashion, a screw head 24 of the attachment screw 15 is provided in one piece or a separate washer 26 whose external diameter corresponds very largely to the diameter of the screw-on dome 17, as a result of which the transverse groove 18 is covered in a seal-forming fashion over the entire length. In order to improve the effectiveness of the seal it is also appropriate additionally to provide a seal 27 or a sealing means between the washer 26 and the screw-on dome 17.

LIST OF REFERENCE NUMBERS

1 Traction mechanism
2 Traction means
3 Output wheel
4 Drive wheel
5 Guide rail
6 Tensioning rail
7 Rotational axis
8 Tensioning system
9 Internal combustion engine 10 Housing
11 Cylinder space
12 Piston
13 Feed bore
14a Bore
14b Bore
15 Attachment screw
16 Feed duct
17 Screw-on dome
18 Transverse groove
19 Screw-on dome
20 Bearing face
21 Transverse groove
22 Spray nozzle
23 Longitudinal groove
24 Screw head
25 Washer
26 Seal
27 Bearing

The invention claimed is:

1. A hydraulically activated tensioning system for a traction mechanism for an internal combustion engine which has a fluid bore, the tensioning system comprising:
a fixed housing intended to receive and guide a piston such that a hydraulic fluid is applied to the piston and the piston interacts directly or indirectly with a tensioning rail that is supported on a traction means, the housing comprising:
a cylinder space with a base extending therein;
a feed bore, which extends from the base of the cylinder space, providing a direct connection between the cylinder space of the housing and the fluid bore in the internal combustion engine for transfer of the hydraulic fluid into the cylinder space;
at least a first side face of the fixed housing having a first surface and a second side face of the fixed housing face having a second surface;
at least one screw-on dome extending from the housing transverse to the cylinder space;
a through bore intended for an attachment screw extending through the screw-on dome, transverse between the first side face and the second side face of the housing and transverse to the cylinder space;
an entirely uniform, arcuately shaped, feed duct extending between the feed bore and the through bore in the first side face of the housing; and
at least one transverse groove formed in the second side face of the housing, perpendicular to the through bore and connected to the through bore, having a spray nozzle,
with a partial quantity of the hydraulic fluid being directed from the feed bore, via the feed duct into the through bore, and emerging from the spray nozzle to lubricate the traction mechanism drive.

2. The tensioning system of claim 1, wherein the through bore of the screw-on dome further comprises a longitudinal groove extending over an entire length of the screw-on dome.

3. The tensioning system of claim 1, wherein the transverse groove has a semicircular cross-sectional profile.

4. The tensioning system of claim 1, wherein the transverse groove widens in a conical shape or wedge shape starting from the through bore.

5. The tensioning system of claim 2, wherein the through bore and/or the longitudinal groove is connected to two or more transverse grooves.

6. The tensioning system of claim 1, wherein the attachment screw encloses a screw head and/or a separately assigned washer has a diameter such that the transverse groove is covered over an entire length.

7. The tensioning system of claim 6, wherein a seal or a sealing means is provided between the screw head of the attachment screw and a bearing face of the screw-on dome.

8. The tensioning system of claim 1, wherein the housing is attached by means of two attachment screws, which lie opposite one another, that are assigned directly to the cylinder space of the housing and are each inserted into through bores of the screw-on dome.

* * * * *